No. 876,346.
PATENTED JAN. 14, 1908.
J. E. GREENAWALT.
PROCESS OF PRECIPITATING METALS.
APPLICATION FILED APR. 3, 1905.
2 SHEETS—SHEET 1.
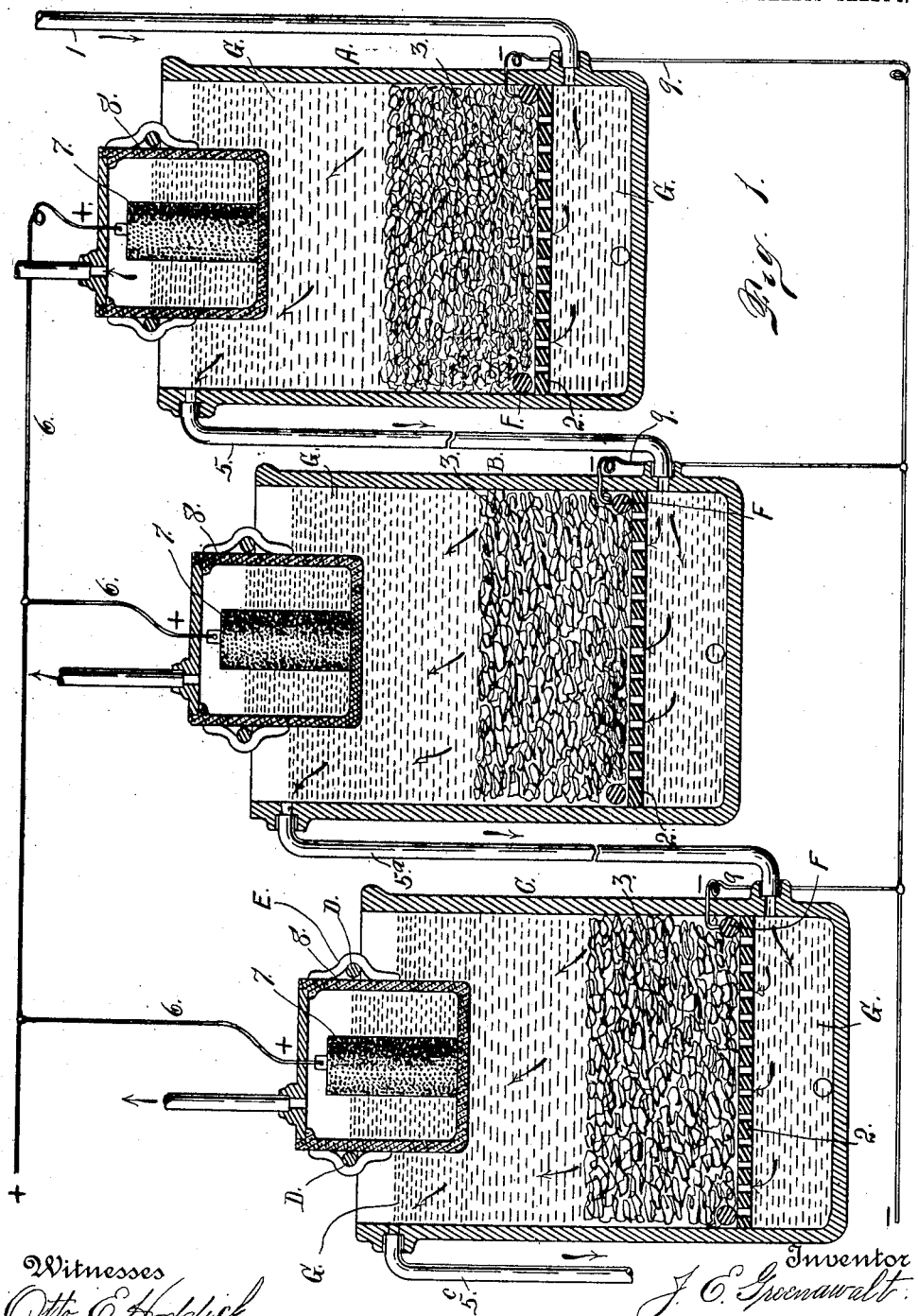

No. 876,346. PATENTED JAN. 14, 1908.
J. E. GREENAWALT.
PROCESS OF PRECIPITATING METALS.
APPLICATION FILED APR. 3, 1905.
2 SHEETS—SHEET 2.
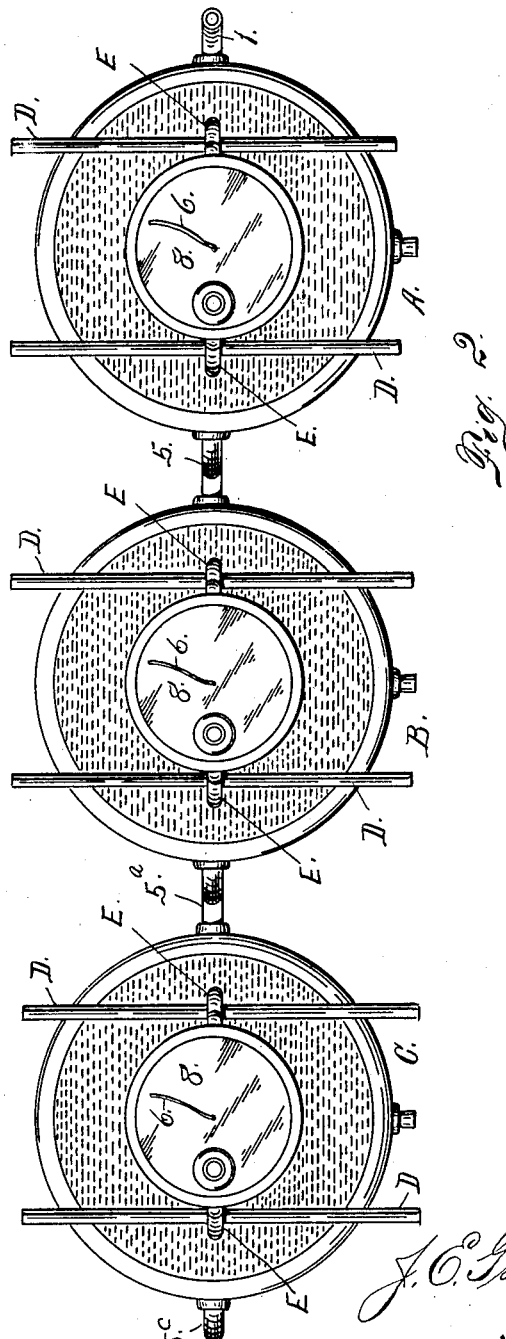

UNITED STATES PATENT OFFICE.

JOHN E. GREENAWALT, OF DENVER, COLORADO.

PROCESS OF PRECIPITATING METALS.

No. 876,346.  Specification of Letters Patent.  Patented Jan. 14, 1908.

Application filed April 3, 1905. Serial No. 253,621.

*To all whom it may concern:*

Be it known that I, JOHN E. GREENAWALT, a citizen of the United States, residing at the city and county of Denver and State of Colorado, have invented a certain new and useful Process of Precipitating Metals; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a process for the precipitation of metals from a solution containing the dissolved metallic values.

The special object of the invention is the thorough and economical precipitation of gold and silver from solutions containing the same, particularly from chlorid solution obtained in the treatment of gold and silver ores by chlorin. This is accomplished by precipitating the gold and silver upon a metallic sponge or shavings consisting preferably of lead with from one-half of one per cent. to one per cent. of zinc.

The object in forming this alloy, is to produce a compound that is slowly and gradually dissolved in the solution. The action between the solution and the metallic precipitant, is just sufficient to loosen or keep in a powdered or slimy condition, the precipitated values.

I have determined that in the electrolytic precipitation of gold and silver from the base solutions as obtained in the leaching of their ores, if an insoluble anode is used the anode is soon covered with a coating of base metal which seriously interferes with the successful precipitation of the valuable metals. I have also determined that lead with a small amount of easily soluble metal such as zinc, forms an excellent precipitant for gold and silver, and this is particularly true if the solution be brought up to a comparatively high temperature of say to one hundred thirty degrees Fahrenheit, or higher. The use of the electric current in connection with the process is preferable in as much as the precipitation is accomplished more rapidly and completely, and further results in greater economy from the fact that a large proportion of the lead dissolved can be reprecipitated upon the lead sponge.

The accompanying drawing illustrates suitable apparatus for practicing my improved process. This apparatus, however, is not claimed in this application but in a companion application filed at the same time.

In this drawing, Figure 1 is a sectional view of three precipitating cells, the same being connected in operative relation, whereby the solution is made to pass through them successively. It is evident that any desired number of these cells may be employed. Fig. 2 is a top plan view of the same.

The same reference characters indicate the same parts in all the views.

Let A, B and C designate three cells which are precisely of the same construction, but given different reference characters for convenience of description. In the lower part of each of these cells is placed a perforated floor or partition 2 upon which the metal sponge or shavings employed in the process of precipitation are placed. In the upper part of this cell is supported a jar 8 composed of porous material in which is placed a carbon anode 7 connected with the positive wire 6 of an electric circuit. The jar 8 is suspended from the top of each cell by means of rods D which pass through ears E located on opposite sides of each jar. As shown in the drawing these supporting rods rest on and project slightly beyond the top of each cell the cells being open.

The mass of metal shavings 3, constitutes the cathode element of the apparatus with which a conductor 9 leading from the negative pole of the electric source is connected. In order to maintain a perfect electrical connection between the cathode element and the negative wire of the source, I place within each cell just above the perforated floor or diaphragm, a metal ring F with which the negative wire or conductor is directly connected.

In carrying out the process, the gold and silver-carrying solution G from a leaching vat (not shown), flows into the cell A through a pipe 1, delivering the solution near the bottom of the cell and just below the perforated floor 2 which supports the metallic shavings 3 as aforesaid. It then flows through the perforated floor, through and among the metallic shavings and finally is discharged from the cell A through a pipe 5 into the cell B at a similar point; and after passing through the last named cell in the same manner as through the cell A, it may be discharged from the top of the cell B through a pipe 5ª into a cell C; after passing through the cell C, if the metallic values have not been completely precipitated, the process may be continued by passing the solution through any desired number of cells of substantially the same construction as heretofore stated. The outlet from the cell C is designated at 5ᶜ in the drawing.

The electric current is supplied through the positive wire 6 to the carbon anode 7, from which it passes through the porous jar 8 into the solution and finally to the metallic sponge or shavings 3 which constitute the cathode of the electrolytic cell. The shavings are brought into direct contact with the negative wire 9 as heretofore explained whereby the circuit is completed.

It is desirable to suspend the anode element at some distance above the cathode sponge, as this arrangement gives a much better distribution of the current through the entire mass of shavings, whereby the gold and silver values are deposited upon the shavings or cathode element. Some of the lead from the shavings enters the solution as chlorid (when the solution is a strong brine) and is precipitated by the current when the amount of gold or silver in the solution is exhausted or comparatively small. This is very desirable since if the current did not precipitate the lead, it would precipitate some of the baser elements which would have a tendency to clog the shavings and introduce undesirable products into the precipitate.

In practice a black pulverulent slime is produced, consisting principally of lead, silver and gold which is readily melted into bullion and the metals separated. The recovered lead is then melted, and a small amount of zinc added, after which the lead mass is cut again into shavings when it is ready for reuse. The shavings are preferably cut about one-sixteenth of an inch wide and one-hundredth of an inch thick. The precipitated slime settles in the lower chamber of the cell. I have found that with a depth of six inches of shavings, an electric current of five amperes for every cubic foot of shavings, gives excellent results.

Having thus described my invention, what I claim is:

1. The herein described process of precipitating gold and silver from their chlorid or bromid solutions, consisting in passing the solution through a mass of metallic lead shavings formed by alloying one per cent. or less of zinc with the lead and then finely dividing said alloy.

2. The herein described process of precipitating gold and silver from their chlorid or bromid solutions, consisting in passing the solution through a mass of metallic lead shavings formed by alloying one per cent. or less of zinc with the lead and then finely dividing said alloy, the solution being heated.

3. The process of precipitating gold and silver from their solutions which consists in passing a solution around and among the metallic surfaces which are slightly soluble in the solution and constituting the cathode element of an electrolytic cell, applying an electric current of a low voltage for the precipitation of the gold and silver and then applying a current of higher voltage to precipitate the metal of the cathode element which has passed into solution during the time of precipitating the gold and silver.

4. The process of precipitating gold and silver from their solutions by passing the solutions around and among metallic surfaces which are slightly soluble in the solution and constituting the cathode element of an electrolytic cell, and applying an electric current to precipitate the gold and silver and also simultaneously reprecipitate the cathode element which has passed into solution.

5. The process of precipitating gold and silver from their solutions which consists in passing the solution through a sponge or mass of metallic shavings consisting of lead with one per cent. or less of zinc alloyed therewith and then melting the precipitate, separating the lead from the gold and silver and again using the lead for precipitating purposes as described.

In testimony whereof I affix my signature in presence of two witnesses.

JOHN E. GREENAWALT.

Witnesses:
DENA NELSON,
A. J. O'BRIEN.